United States Patent
Walker et al.

(10) Patent No.: US 11,249,918 B2
(45) Date of Patent: Feb. 15, 2022

(54) MAPPING ENTRY INVALIDATION

(71) Applicant: Hewlett Packard Enterprise Development LP, Houston, TX (US)

(72) Inventors: Shawn K. Walker, Fort Collins, CO (US); Christopher Shawn Kroeger, Longmont, CO (US); Derek A. Sherlock, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 466 days.

(21) Appl. No.: 16/174,738

(22) Filed: Oct. 30, 2018

(65) Prior Publication Data
US 2020/0133877 A1 Apr. 30, 2020

(51) Int. Cl.
*G06F 12/1009* (2016.01)
*G06F 13/16* (2006.01)
*G06F 13/42* (2006.01)

(52) U.S. Cl.
CPC .......... *G06F 12/1009* (2013.01); *G06F 13/16* (2013.01); *G06F 13/4282* (2013.01); *G06F 2212/657* (2013.01); *G06F 2213/0026* (2013.01)

(58) Field of Classification Search
CPC ............. G06F 12/1009; G06F 12/1027; G06F 12/0246; G06F 2212/657; G06F 2212/683
USPC ........................................................ 711/206
See application file for complete search history.

(56) References Cited

U.S. PATENT DOCUMENTS

| 9,959,214 | B1 | 5/2018 | Habusha et al. | |
|---|---|---|---|---|
| 2008/0120487 | A1* | 5/2008 | Saripalli | G06F 12/1081 711/206 |
| 2009/0144508 | A1* | 6/2009 | Freimuth | G06F 12/1081 711/145 |
| 2010/0281201 | A1* | 11/2010 | O'Brien | G06F 13/4027 710/308 |
| 2013/0138840 | A1* | 5/2013 | Kegel | G06F 12/1081 710/22 |
| 2013/0268728 | A1 | 10/2013 | Ramanujan et al. | |

(Continued)

FOREIGN PATENT DOCUMENTS

KR 10-2013-0068581 A 6/2013

OTHER PUBLICATIONS

Search Report and Written Opinion received for PCT Application No. PCT/US2019/058935, dated Apr. 29, 2020, 12 pages.

(Continued)

*Primary Examiner* — Titus Wong
(74) *Attorney, Agent, or Firm* — Rathe Lindenbaum LLP

(57) ABSTRACT

A memory access system may include a first memory address translator, a second memory address translator and a mapping entry invalidator. The first memory address translator translates a first virtual address in a first protocol of a memory access request to a second virtual address in a second protocol and tracks memory access request completions. The second memory address translator is to translate the second virtual address to a physical address of a memory. The mapping entry invalidator requests invalidation of a first mapping entry of the first mapping address translator requests invalidation of a second mapping entry of the second memory address translator corresponding to the first mapping entry following invalidation of the first mapping entry and based upon the tracked memory access request completions.

17 Claims, 6 Drawing Sheets

(56) References Cited

U.S. PATENT DOCUMENTS

| | | |
|---|---|---|
| 2014/0181454 A1 | 6/2014 | Manula et al. |
| 2015/0242319 A1 | 8/2015 | Evans et al. |
| 2015/0347349 A1* | 12/2015 | Raindel .................. G06F 13/28 |
| | | 710/308 |
| 2016/0077976 A1* | 3/2016 | Raikin .................. G06F 13/385 |
| | | 711/207 |
| 2016/0179698 A1* | 6/2016 | Blaner ................ G06F 12/1009 |
| | | 711/207 |
| 2017/0177501 A1 | 6/2017 | Guthrie et al. |
| 2018/0137074 A1 | 5/2018 | Sethi et al. |

OTHER PUBLICATIONS

IDT White Paper; "Using the IDT PCI Express Standard System-interconnect Solution to Deliver Predictable, Secure, High-RAS Communications in Bladed Systems"; printed on Jul. 12, 2018 from: < https://www.idt.com/document/whp/idt-pcie-system-interconnect-solutions >.

Lucas, V.; "Gen Z Overview"; Jul. 2017; 18 pages.

Morgan, B et al.; "IOMMU Protection Against I/O Attacks: A Vulnerability and a Proof of Concept"; Jan. 9, 2018; 17 pages.

* cited by examiner

MAPPING ENTRY INVALIDATION

This invention was made with Government support under Prime Contract No. DE-AC52-07NA27344 awarded by DOE. The Government has certain rights in this invention.

BACKGROUND

Computing systems frequently involve different memory domains or protocols for addressing memory. To accommodate such different protocols, a first memory access translator is used to translate memory access request for a first virtual address in a first protocol to a second virtual address in a second protocol and a second memory access translator is used to translate the second virtual address to a physical address. The first memory translator may include a mapping table having mapping entries that map virtual addresses in the first protocol to virtual addresses in the second protocol. The second memory translator may include a mapping table that maps virtual address in the second protocol to physical addresses.

Figure 1:
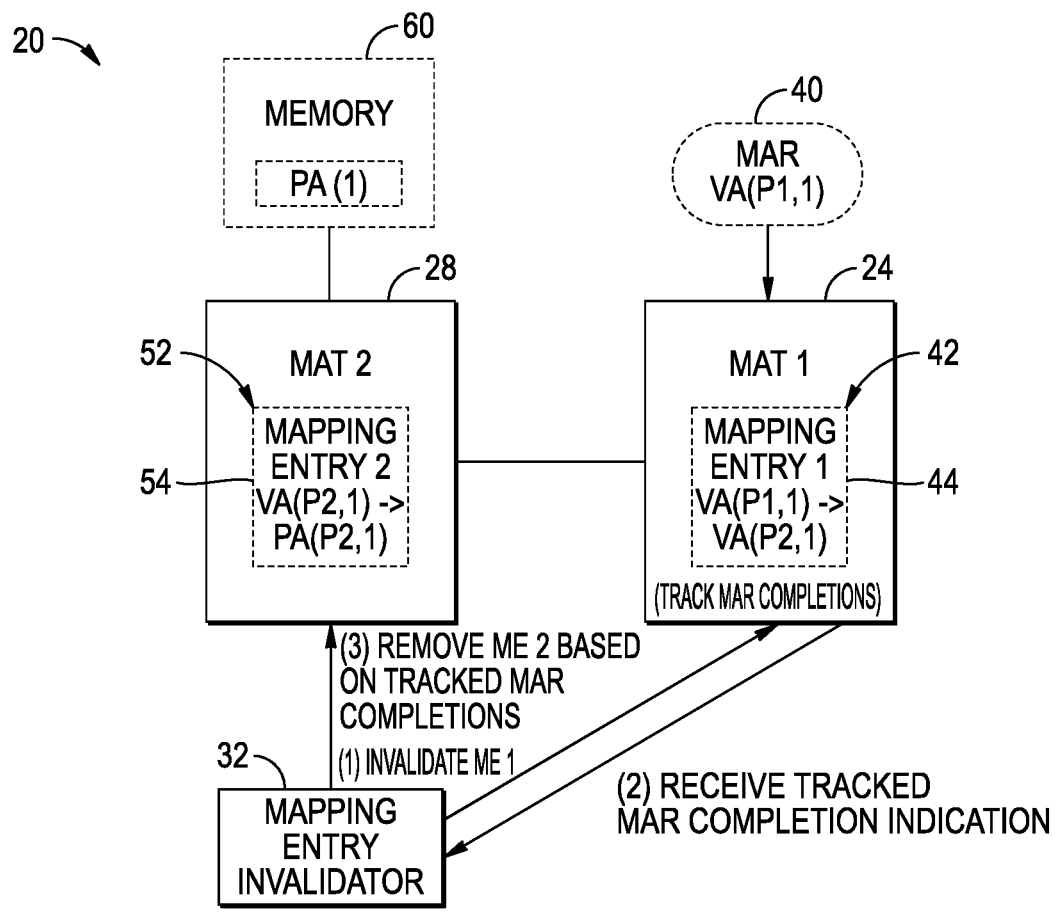
FIG. 1 is a block diagram schematically illustrating portions of an example memory access system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example memory access systems, memory address translators and mapping entry invalidators that reduce a likelihood of mapping entries of a memory address translator being prematurely invalidated before all in transit, queued or otherwise uncompleted memory access requests to the memory address translator and corresponding to the mapping entry have been completed. Central processing cores often request that mapping entries in different memory address translators be removed or otherwise invalidated, such as upon closing of an application that utilizes such memory. In computing systems where a first memory address translator translates a memory access request for a first virtual address in a first protocol to a second virtual address in a second protocol and where a second memory access translator translates the second virtual address to a physical address, invalidation of a mapping entry for the second virtual address in the second memory address translator before all memory access requests for the second virtual address in transit from the first memory access translator have been completed may result in errors. The disclosed memory access systems, memory address translators and mapping entry invalidators delay invalidation of mapping entries in the second memory address translator until all memory access requests for a mapping entry to be invalidated or completed.

The disclosed memory access systems, memory address translators and mapping entry invalidators reduce the likelihood of a mapping entry in the second, intermediate mapping address translator being removed or otherwise invalidated before all memory access requests to the mapping entry have been completed by tracking the completion of such memory access requests at the first mapping address translator. The memory entry invalidator receives data from the first mapping address translator indicating when all of such memory access requests for the mapping entry of the second mapping address translator to be invalidated have been completed. The memory entry invalidator delays requesting invalidation of the mapping entry at the second mapping address translator until such data is received.

In one implementation, the first memory address translator, upon receiving a request to invalidate a mapping entry for a virtual address from a mapping entry invalidator, begins tracking outstanding memory access requests issued by the first memory address translator to a second memory address translator. In one implementation, such tracking begins with the first memory address translator taking a snapshot in time for those outstanding memory access requests issued by the first memory address translator to the second memory address translator for the mapping entry to be invalidated. Thereafter, the mapping entry invalidator repeatedly requests data from the first memory address translator indicating a status of the outstanding memory access requests to the second memory address translator for the mapping entry to be invalidated.

In one implementation, the first memory address translator includes a counter that changes in response to changes in the snapshot of the outstanding memory access requests corresponding to the mapping entry to be invalidated. The mapping entry invalidator issues posted reads to the first memory address translator to read the value of this counter. Such reads are repeatedly issued until such reads indicate a change in a value of the counter. In response to the counter being changed, such as the counter being incremented, the mapping entry invalidator issues a request to invalidate the mapping entry at the second memory address translator. In computer systems where multiple mapping entry invalidators, such as multiple mapping entry invalidators of multiple computing cores, may be issuing requests to invalidate a mapping entry at the first memory address translator, each of the mapping entry invalidators delays the issuance of a request to invalidate the mapping entry at the second memory address translator until the reads issued to the first memory address translator indicates that the counter has changed a multiple number of times, the multiple number of times being equal to the number of different mapping entry invalidators or different processing cores that are issuing such mapping entry invalidation requests.

Disclosed herein are various components of a computing system such as memory address translators and mapping entry invalidators. The memory address translators and mapping entry invalidators comprise electronic componentry in the form of processors or logic that carry out programs, logic or instructions contained in a non-transitory computer-readable medium or logic circuitry. In one implementation, the memory address translators are provided as part of fabric interfaces in the form of a bridge circuit or chip. In one implementation, the mapping entry invalidators comprise software modules provided as part of the processing cores of the computing system.

Disclosed herein are memory access systems that may include a first memory address translator, a second memory address translator and a mapping entry invalidator. The first memory address translator translates a first virtual address in a first protocol of a memory access request to a second virtual address in a second protocol and tracks memory access request completions. The second memory address translator is to translate the second virtual address to a physical address of a memory. The mapping entry invalidator requests invalidation of a first mapping entry of the first mapping address translator requests invalidation of a second mapping entry of the second memory address translator corresponding to the first mapping entry following invalidation of the first mapping entry and based upon the tracked memory access request completions.

Disclosed herein are examples of a memory address translator. The memory address translator may include a mapping table having entries linking a first virtual address in a first protocol to a second address, a tracker to track outstanding uncompleted memory access requests output by the memory address translator and a snapshot module. The snapshot module captures a snapshot of outstanding uncompleted memory access requests corresponding to a mapping entry of the mapping table in response to invalidation of the mapping entry in the mapping table.

Disclosed herein are example mapping entry invalidators. The example mapping entry invalidators comprise a non-transitory computer-readable medium having instructions. The instructions to direct a processor to output a first mapping entry invalidation request to a first memory address translator, wherein the first mapping entry invalidation request requesting invalidation of a mapping entry of a mapping table. The instructions further direct the processor to receive an indication from the first memory address translator that all outstanding uncompleted memory access requests, corresponding to the mapping entry of the mapping table and output by the first memory address translator to a second memory address translator prior to invalidation of the mapping entry, have been completed. The instructions further direct the processor, in response to receiving the indication, to output a second mapping entry invalidation request to the second memory address translator, wherein the second mapping entry invalidation request requesting invalidation of a second mapping entry of a second mapping table of the second memory address translator.

FIG. 1 is a block diagram schematically illustrating portions of an example memory access system 20. Memory access system 20 reduces a likelihood of mapping entries of a memory address translator being prematurely invalidated before all in transit, queued or otherwise uncompleted memory access requests to the memory address translator and corresponding to the mapping entry have been completed. Memory access system 20 delays invalidation of mapping entries in the second memory address translator until all memory access requests for a mapping entry to be invalidated are completed. Memory access system 20 comprises memory address translator 24, memory address translator 28 and mapping entry invalidator 32.

Memory address translator 24 comprises processor directing software or logic circuitry in a memory fabric, such as a bridge circuit or other circuit or chip. Memory address translator 24 receives memory address requests, such as memory address request (MAR) 40 (shown in broken lines), wherein such memory address requests request access to a virtual address VA according to a first protocol P1 of a memory. Such memory access requests may be requesting reads of a memory or writes to a memory.

As shown by broken lines, memory address translator 24 (MAT 1) comprises a mapping table 42 having various mapping entries for mapping different virtual address this in the first protocol P1 to virtual addresses and a second protocol P2. Mapping table 42 includes a particular mapping entry (MAPPING ENTRY 1) 44. In one implementation, mapping table 42 maps virtual addresses in a Gen Z protocol (established and created by the Gen Z Consortium) to a Peripheral Component interface (PCIe) protocol. In other implementations, mapping entry table 42 may map between virtual addresses of other different "memory-semantic" protocols.

As shown by broken lines, memory address translator 24 further tracks memory address request completions, those memory address requests issued or forward by translator 24 to translator 28 and for which translator 24 has received some communication or acknowledgment, in the form of a specific acknowledgment to a non-posted read or write or based upon an ordered communication following a posted read or write, indicating that such requests have been received and completed by memory address translator 28. In one implementation, memory address translator 24 tracks such completions using multi-bit vectors. For example, 16 outstanding memory access requests may utilize two 16-bit vectors. A main tracker may set a bit when issuing a request and clear a bit when getting a read completion or a non-posted acknowledgment. In other implementations, memory address translator 24 may track memory address request completions in other fashions.

Memory address translator 28 comprises processor directing software or logic circuitry in a memory fabric, such as a bridge circuit or other circuit or chip. Memory address translator 28 receives memory address requests, such as memory address requests for accessing a virtual address in a second protocol P2. Such memory access requests may be requesting reads of a memory or writes to a memory.

As shown by broken lines, memory address translator 28 (MAT 2) comprises a mapping table 52 having various mapping entries for mapping different virtual address this in the second protocol P2 to physical addresses (PA) of a memory 60 (shown in broken lines). Mapping table 52 includes a particular mapping entry (MAPPING ENTRY 2) 54 which corresponds to mapping entry 44. In one implementation, mapping table 52 maps virtual address is in a Peripheral Component interface (PCIe) protocol to a physical address in memory 60. In other implementations, mapping entry table 52 may map between virtual addresses of other different "memory-semantic" protocols.

As shown in broken lines, in the example illustrated, memory address translator 24 may receive a memory address request 40 requesting access to a virtual address 1 in a first protocol P1 (VA, (P1,1)). Memory address translator 24 has an entry 44 which maps the virtual address VA(Pa,1) to a corresponding virtual address 1 in a second protocol (VA(P2,1). Memory address translator 28 has a corresponding entry 54 in mapping table 52, mapping VA(P2,1) in the second protocol P2 to a corresponding physical address 1 memory 60.

Mapping entry invalidator 32 comprises electronic componentry in the form of processors or logic that carry out programs, logic or instructions contained in a non-transitory computer-readable medium or logic circuitry. In one implementation mapping entry invalidator 32 comprises software modules provided as part of a processing core of a computing system. Mapping entry invalidator 32 invalidates the mapping entries of tables 42 and 52 such as when such physical addresses are no longer being accessed. For example, mapping entry invalidator 32 invalidates or removes mapping entries 44 and 54 in response to the corresponding physical address in memory 60 no longer being used, such as when a particular application is no longer using the physical address. Mapping entry invalidator 32 delays invalidation of mapping entries in mapping table 52 of memory address translator 28 until ensuring that all in transit, queued or otherwise uncompleted memory access requests to the to-be-invalidated mapping entry have been completed. Mapping entry invalidator 32 delays invalidation of mapping entries in mapping table 52 of memory address translator 28 until receiving an indication from memory address translator 24 that all of the outstanding memory access requests for mapping entry of mapping table 52 have been completed based upon the tracking of such outstanding memory address requests by memory address translator 24.

Figure 2:
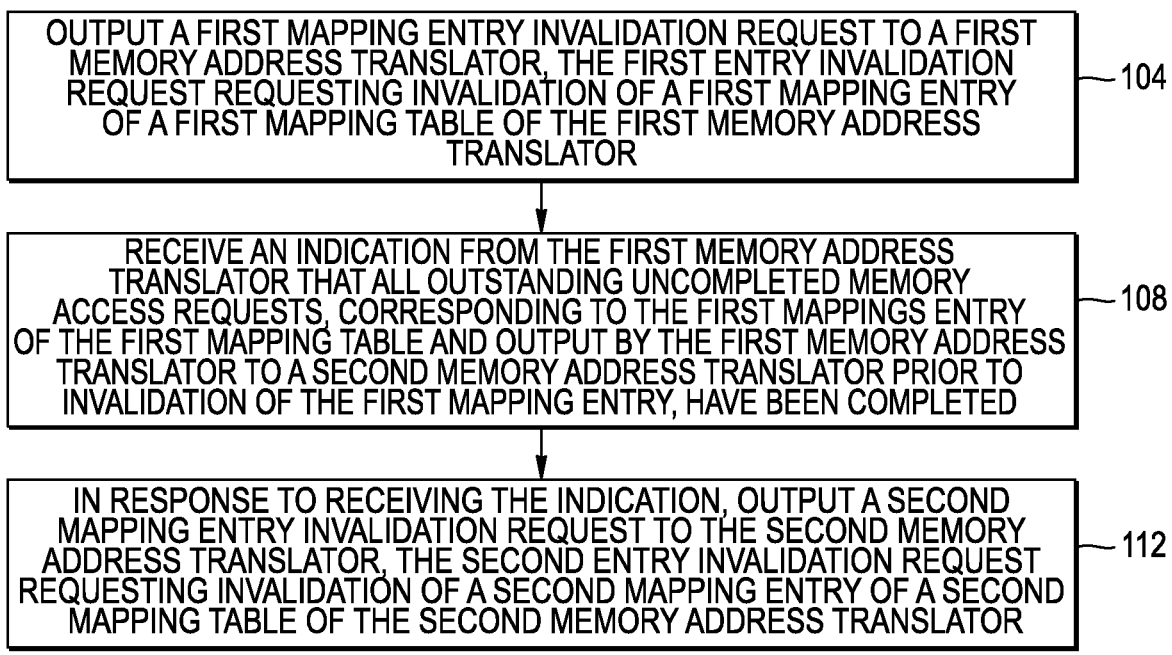
FIG. 2 is a flow diagram of an example method for providing memory access across different domains having different protocols.

FIG. 2 is a flow diagram of an example method 100 for accessing memory across different computer protocols. Method 100 reduces a likelihood of mapping entries of a memory address translator being prematurely invalidated before all in transit, queued or otherwise uncompleted memory access requests to the memory address translator and corresponding to the mapping entry have been completed. Although method 100 is described in the context of being carried out by memory access system 20 described above, it should be appreciated that method 100 may likewise be carried out in any of the following described memory access systems or with similar memory access systems.

As indicated by block 104 and depicted in FIG. 1, mapping entry invalidator 32 outputs a first entry invalidation request to memory address translator 24 (invalidate ME 1). The first entry invalidation request requesting invalidation of a mapping entry, such as entry 44, of mapping table 42. Such a request may be spurred by an application that uses the address mapped by the entry being closed and thus is no longer being used.

During the lapse of time from when mapping entry invalidator 32 outputs or issues the mapping entry invalidation request to the time that memory address translator 24 receives the mapping entry invalidation request, mapping address translator 24 may continue to output translated memory address requests to memory address translator 28. At the time that memory address translator 24 receives the mapping entry invalidation request from mapping entry invalidator and carries out such invalidation of the mapping entry, memory access requests for the particular mapping entry may be outstanding, having been issued are sent by mapping address translator 24 and not yet completed by mapping address translator 28. Mapping address translator 24 tracks the status of memory access requests translated by memory address translator 24 and sent to memory address translator 28. Mapping address translator 24 tracks such memory address requests to identify those memory address requests which remain outstanding, have not yet been completed.

Following issuance of the mapping entry invalidation request for a particular mapping entry, mapping entry invalidator 32 repeatedly communicates with mapping address translator 24 to determine if any mapping address requests for the particular mapping entry remain outstanding. As indicated by block 108, mapping entry invalidator 32 receives an indication from the first memory address translator, mapping address translator 24, that all outstanding uncompleted memory access requests, corresponding to the to be invalidated mapping entry of the mapping table and output by the first memory address translator 24 to the second memory address translator 28 prior to invalidation of the mapping entry, have been completed.

As indicated by block 112, in response to receiving the indication that all of the outstanding memory access requests for accessing an address corresponding to the mapping entry to be deleted have been completed, mapping entry invalidator 32 outputs a second mapping entry invalidation request to mapping address translator 28. The second mapping entry invalidation request requests invalidation of a second mapping entry of the second mapping table that corresponds to the first mapping entry 44 that was previously invalidated in the mapping table 42 of memory address translator 24. Because the mapping entry invalidation request that requests invalidation of the second mapping entry is delayed until all of the outstanding memory access requests corresponding to the to be deleted second mapping entry have been completed, processing errors resulting from the outstanding mapping entry requests arriving at memory address translator 28 after the corresponding mapping entry has already been deleted are avoided.

Figure 3:
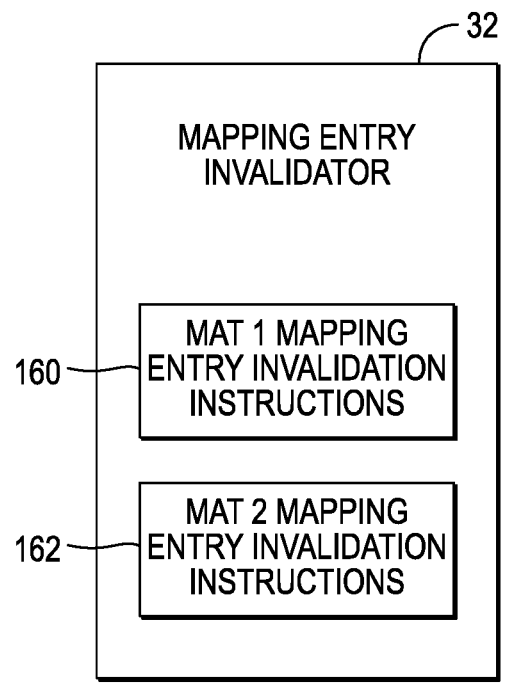
FIG. 3 is a block diagram schematically illustrating portions of an example mapping entry invalidator of the example system of FIG. 1.

FIG. 3 is a block diagram schematically illustrating portions of an example mapping entry invalidator 32. Mapping entry invalidator 32 comprises a non-transitory computer-readable medium that provides instructions or logic for a processor. Mapping entry invalidator 32 comprises memory address translator 1 mapping entry invalidation instructions 160 and memory address translator 2 mapping entry invalidation instructions 162.

MAT 1 mapping entry invalidation instructions are to direct a processor to invalidate mapping entries in mapping address translator 24. Such instructions may be triggered by an application or program that uses an address corresponding to a mapping entry being closed or terminated. Instructions 160 carry out block 104 and method 100 described above.

MAT 2 mapping entry invalidation instructions 162 are to direct a processor to invalidate mapping entries in mapping address translator 28. Instructions 162 cause a processor to determine the status of outstanding memory address requests for an address corresponding to a mapping entry deleted by MAT 1 in memory address translator 24. In one implementation, instructions 162 cause a processor to repeatedly transmit inquiries, in the form of read requests to memory address translator 24, the read request requesting reads of data indicating the status of outstanding memory access requests transmitted to mapping address translator 28 for an address corresponding to a mapping entry deleted by MAT 1 per the instruction of the mapping entry invalidator 32.

Upon the processor of mapping entry invalidator 32 receiving an indication that all of the previous outstanding memory address requests for accessing a memory, corresponding to the address of the mapping entry that was deleted in translator 24, have been completed, instructions 162 cause the process to output a request to memory address translator 28, instructing memory address translator 28 to invalidate its mapping entry that corresponds to the mapping entry of translator 24 that was previously invalidated.

Figure 4:
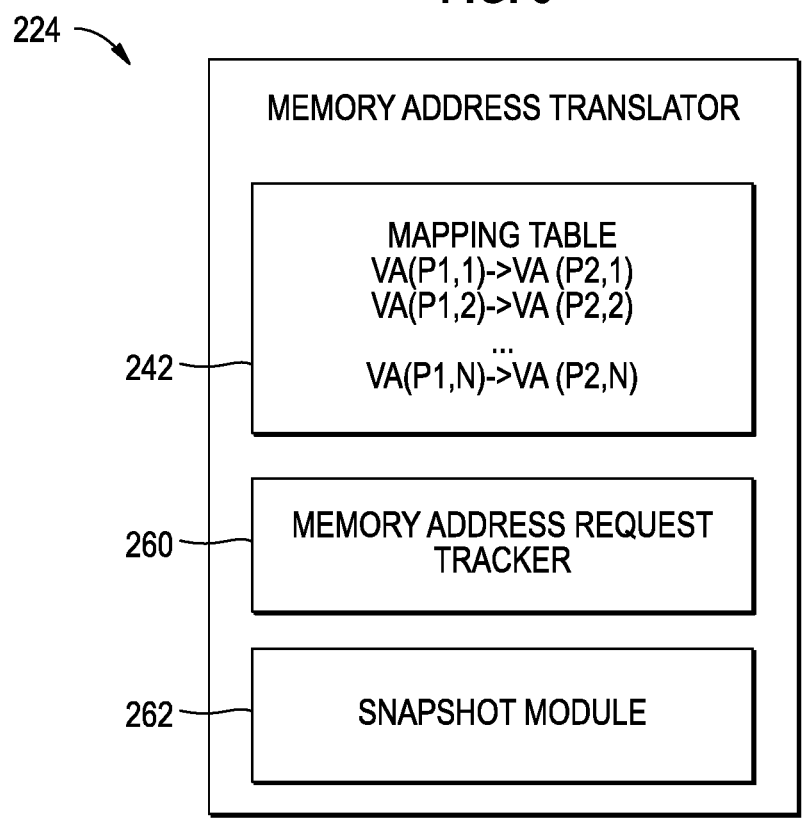
FIG. 4 is a block diagram schematically illustrating portions of an example memory address translator of the example system of FIG. 1.

FIG. 4 is a block diagram illustrating portions of an example memory address translator 224, an example of memory address translator 24. Memory address translator 224 receives memory address requests for accessing a virtual address pursuant to a first protocol. For example, in one implementation, memory address translator 224 may receive memory address requests requesting access to a virtual address following a Gen Z protocol. Memory address translator 224 translates or identifies the virtual address in a second protocol that corresponds to the virtual address in the first protocol and contained in the received memory address request. For example, memory address translator 224 may identify the virtual address in a PCIe protocol that corresponds to the virtual address in the Gen Z protocol. Using the identified second protocol virtual address, translator 224 modifies the received memory address request to utilize the virtual address of the second protocol in place of the virtual address of the first protocol. Translator 224 then sends the modified memory address request to the memory address translator 28. Memory address translator 224 comprises mapping table 242, memory address request tracker 260 and snapshot module 262.

Mapping table 242 comprises a mapping table having various mapping entries for mapping different virtual addresses in a first protocol P1 to virtual addresses and a second protocol P2. In one implementation, mapping table 242 maps virtual addresses in a Gen Z protocol to a Peripheral Component interface (PCIe) protocol. In other implementations, mapping entry table 242 may map between virtual addresses of other different "memory-semantic" protocols.

Memory address request tracker 260 tracks the status of memory access requests output by translator 224 to translator 28. In one implementation, memory address request tracker 260 tracks the status of all memory access requests output by translator 224 to translator 28 for all of the entries of the mapping table 242 of translator 224. In one implementation, memory address request tracker 260 utilizes a 16-bit vector to track up to 16 outstanding memory requests. Tracker 260, sometimes referred to as a main tracker, sets a bit when issuing a memory access request directed to a virtual address in the second protocol P2. Tracker 260 clears the bit when receiving a communication indicating that the request has been completed, such as receiving a read completion or a non-posted acknowledgment.

Snapshot module 262 comprising instructions to direct a processor to generate a snapshot or a copy of tracker 260 in response to receiving a status request, such as a draining read request, from mapping entry invalidator 32. In one implementation, the "snapshot" is that of all outstanding memory requests at a particular moment in time, regardless of their virtual addresses. In other words, the snapshot may include the status of outstanding memory requests, wherein some of the memory request may be for the same virtual address and other of the memory request may be for different virtual addresses. Changes in the state of the snapshot may reflect the status of outstanding memory access requests for virtual addresses in the second protocol P2. Such changes in the snapshot may be communicated to mapping entry invalidator 32 in response to the status request. The changes in the snapshot may indicate to the mapping entry invalidator whether or not any outstanding memory address requests for a mapping entry that is to be invalidated in MAT 28 remain. The information provided by snapshot module 262 may be used by mapping entry invalidator 32 to determine when to issue a mapping entry invalidation request to MAT 28 for the mapping entry.

In one implementation, the status of the snapshot module 262 may be reflected by a counter. Changes in the state of the snapshot, such as changes in the 16-bit vector example, may result in changes to the counter. In one implementation, the values of the counter are transmitted to the mapping entry invalidator 32 as an indication of the status of outstanding memory address requests. In one implementation, each time a snapshot is taken and a snapshot vector clears or changes, the counter is incremented. The value of the counter is returned for each draining read request (the status request) received from the mapping entry invalidator. The incrementing of the counter value, and not its particular value, indicates forward progress in the draining of memory address requests. The mapping entry invalidator 32 issues at least two draining read requests, wherein the first read request is a starting counter value and where the mapping entry invalidator 32 continues to issue such draining read requests until the counter value has been incremented. In one implementation, the snapshot of currently tracked memory requests is done after invalidation of a mapping entry (guaranteed by draining read request being a PCIe non-posted read to the virtual address of the mapping entry which is ordered to the PCIe posted write invalidation write). The completion of a draining read request is a PCIe completion which is ordered to upstream posted memory writes. In some implementations, rather than the counter being incremented, the counter may be decremented.

Figure 5:
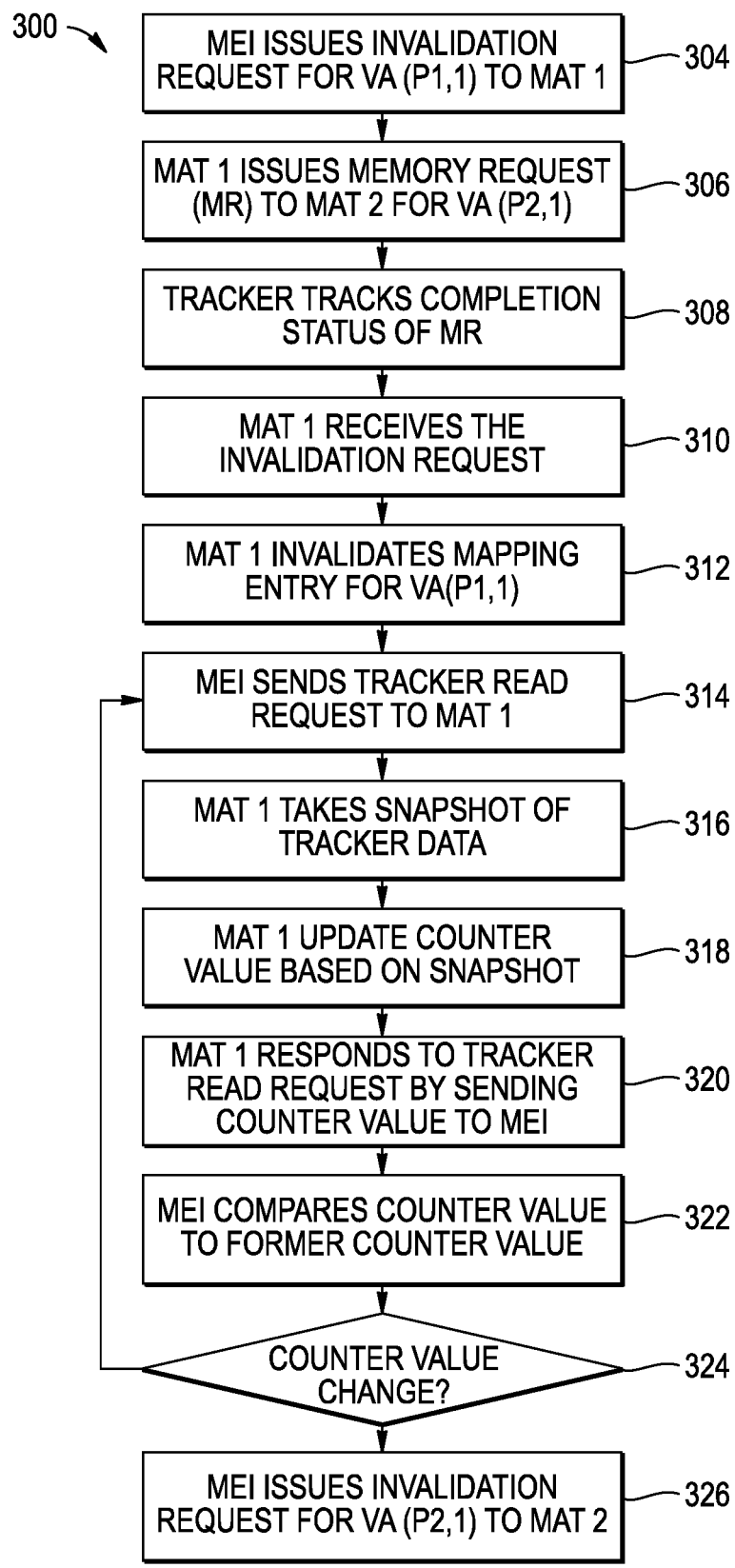
FIG. 5 is a flow diagram of an example memory access request flow.

FIG. 5 is a flow diagram of an example memory access request flow 300 carried out by system 20 with the mapping entry invalidator 32 of FIG. 3 and the memory address translator 224 of FIG. 4. In other implementations, the illustrated example memory access request flow 300 may be carried out with other similar systems. As indicated by block 304, mapping entry invalidator 32 (MEI) issues an invalidation request for a first virtual address 1 in the first protocol P1 to the mapping address translator 24. As indicated by block 306, prior to receiving the invalidation request, the memory address translator 224 issues a memory address request or memory request (MR) to mapping address translator 28 (MAT 2) for a second virtual address 1 in a second protocol P2, wherein the second virtual address 1 in the second protocol P2 corresponds to the first virtual address 1 in the first protocol P1. As indicated by block 308, memory address request tracker 260 tracks the status of the memory request MR made in block 306. As indicated by block 310, the memory address translator 224 receives the invalidation request issued in block 304. As indicated by block 312, memory address translator 242 invalidates the mapping entry corresponding to the virtual address VA(P1,1).

As indicated by block 314, in response to the issuance of the invalidation request in block 304, mapping entry invalidator 32 begins sending tracker read requests to memory address translator 224. As indicated by block 316, in response to receiving the tracker read request sent or issued in block 314 by mapping entry invalidator 32, snapshot module 262 takes a snapshot of tracker data. In one implementation, MAT 1 may not start a snapshot should another snapshot be already in progress. As indicated by block 318, memory address translator 224 updates its counter value based upon the snapshot. Changes in the snapshot result in the counter value being changed, such as a counter value being incremented. In other implementations, changes in the snapshot may result in the counter value being decremented or changed in other fashions.

As indicated by block 320, memory address translator 224 responds to the tracker read request by sending the counter value to the mapping entry invalidator 32. The response is immediate and does not depend upon whether the counter values has been updated or changed in block 318 and without waiting for the snapshot is 316 to have been completed. In one implementation, the tracker read request is in the form of a draining read request for reading a value of the counter. The response to the draining read request (the status request) is the value of the counter. In other implementations, the response indicating the value of the counter or otherwise indicating the status of previously outstanding memory requests for the previously outstanding memory requests for the invalidated mapping entry may be communicated in other forms.

As indicated by block 322, the mapping entry invalidator 32 compares the indicated value for the counter to a former counter value received from mapping entry invalidator 224 for the same to be invalidated mapping entry. As indicated by decision block 324, if the value of the counter has not changed, such as the value of the counter not being incremented since the last tracker read request, the mapping entry invalidator 32 returns to block 314 where mapping entry invalidator 32 sends another tracker read request and the cycle between block 314-324 continues until all of the outstanding memory requests for addresses corresponding to the to be invalidated mapping entry have been completed. As indicated by block 326, if the counter value has changed, indicating that all of the outstanding memory requests for addresses corresponding to the to be invalidated mapping entry have been completed, mapping entry invalidator 32 issues and invalidation request to mapping address translator 28 to invalidate the mapping entry for VA(P2,1) in the mapping table 52.

Figure 6:
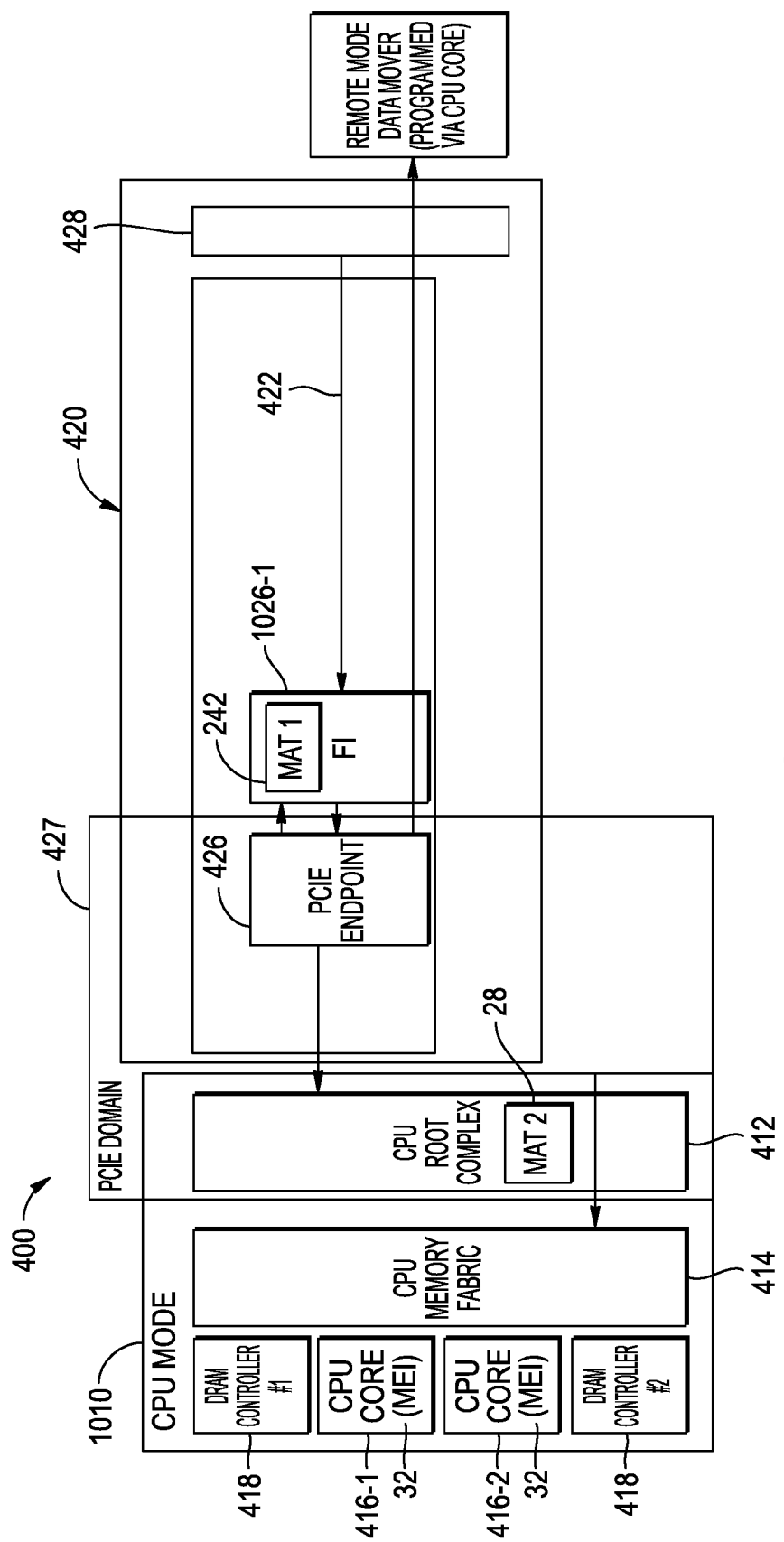
FIG. 6 is a block diagram schematically illustrating portions of an example computer system.

FIG. 6 schematically illustrates portions of an example computing system 400. Computing system 400 comprises central processing unit (CPU) node 410 and protocol converter 420. CPU node 410 comprises a root complex 412, a CPU memory fabric 414, CPU cores 416 and CPU memories 418. The root complex 412 comprises a memory address translator 28 as described above. In the example illustrated, the memory address translator 28 translates a non-PCI domain virtual address (such as a Gen Z domain virtual address) to a PCIe domain virtual address. Each of CPU cores 416 comprises a mapping entry invalidator 32 as described above.

The PCIe protocol converter 420 comprises PCIe channels or link 422. Although converter 420 is illustrated as comprising a single independent PCIe links, converter 420 may comprise multiple links, with each link having a corresponding memory address translator. For example, in one implementation converter 420 may comprise four independent PCIe links.

Link comprises an endpoint and a fabric interface. In the example illustrated, link 422 comprises endpoint 424 and fabric interface 426. Endpoint 424 and the CPU root complex 412 form a PCIe domain 427. The protocol converter further comprises a fabric switch 428 that is connected to the fabric interface 426 and is further connectable to a remote node 419, such as a CPU node that is operating according to a non-PCIe protocol. The fabric switch 428 is to transmit reads and writes from the remote node 419 across link 422.

Fabric interface 422 comprises a memory address translator 224 as described above. Because computing system 400 comprises multiple cores with each core having a mapping entry invalidator 32, system 400 presents a multicore issue where one of the cores 416 may issue a status request such as a draining read request to start a snapshot to early relative to the other one of cores 416 that may be still issuing and invalidation request. For example, core 416-1 may issue an invalidation request followed by issuing a status/draining read request which triggers the start of a snapshot. Thereafter, core 416-2 may issue an invalidation request. Meanwhile, until receipt of the mapping entry invalidation request from core 416-2, fabric interface 426 may still be issuing memory requests. The core 416-2 then issues a status request/draining read with a snapshot already in progress in response to the status request of the core 416-1. If core 416-2 merely looks for a counter increment of one, only the memory requests for core 416-1 have necessarily been completed, not those memory requests for core 416-2. As a result, core 416-2 continues to issue reads until receiving an indication that the snapshot has changed twice.

Figure 7:
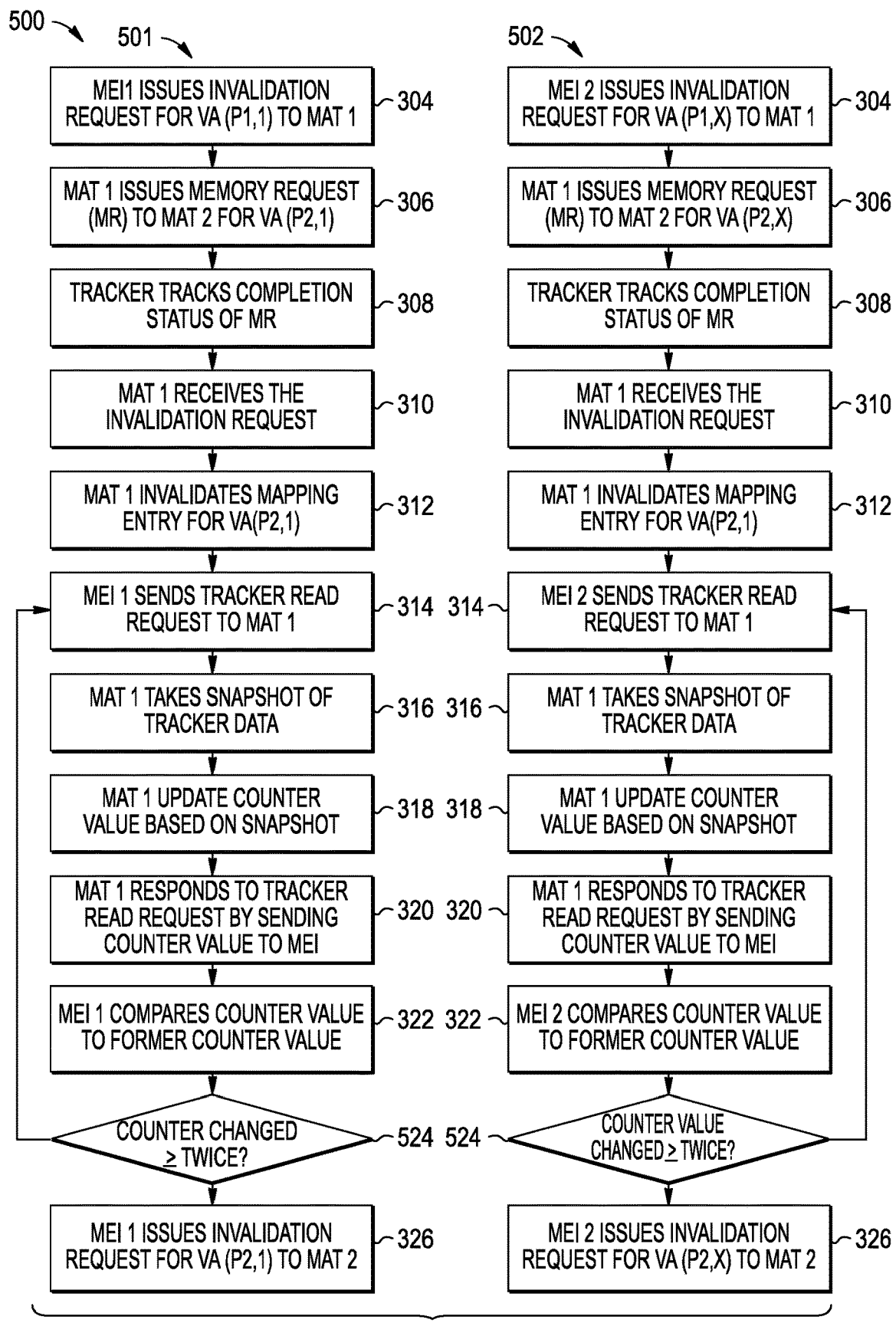
FIG. 7 is a flow diagram of an example memory access request flow for the computer system of FIG. 6.

FIG. 7 is a flow diagram of an example memory access request flow 500 illustrating an example multicore scenario and an example solution. Although the example flow is described in the conscience of being carried out by computer system 400, it should be appreciated that the process flow may likewise be carried out other computer systems having similar configurations. The left-hand flow 501 illustrates actions taken by core 416-1 and its mapping entry invalidator 32 while the right-hand flow illustrates actions taken by core 416-2 and its mapping entry invalidator 32.

Each of the left-hand flow 501 and the right-hand flow 502 is similar to flow 300 described above with respect to FIG. 5 except that decision block 324 is replaced with decision block 524, wherein each of the mapping entry invalidators 32 of the respective cores 416-1, 416-2 delays issuing of the invalidation request for a particular mapping entry (such as virtual address VA(P2,1)) in the mapping table of memory address translator 28 until the counter value received from memory address translator 242 has been changed at least twice.

Figure 8:
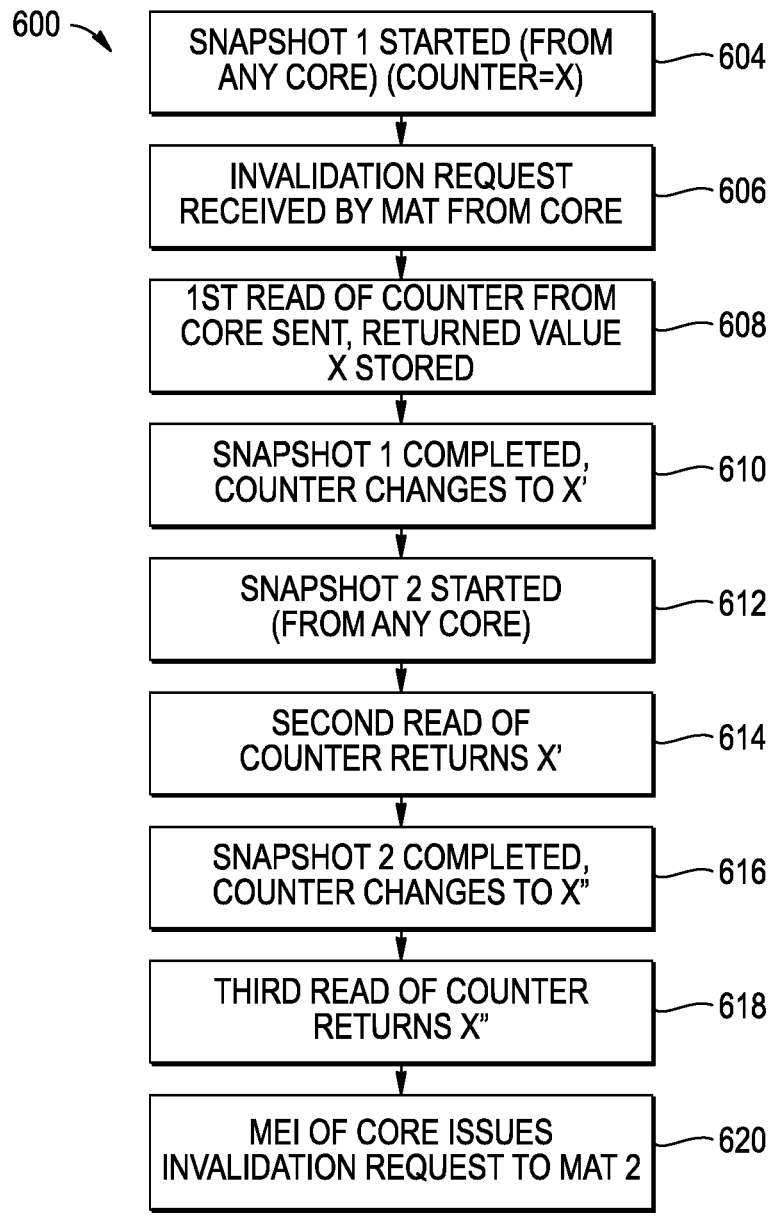
FIG. 8 is a flow diagram of an example memory access request flow for a computer system.

FIG. 8 is a flow diagram of an example memory access request flow 600 that may be carried in a multi-core computing system. Flow 600 is described from the perspective of an individual mapping entry invalidator of a particular CPU "Core" and a computer system that includes multiple CPU cores and multiple corresponding mapping entry invalidators. As indicated by block 604, a memory address translator starts a snapshot 1 of outstanding memory access requests issued by the memory address translator. For example, those outstanding memory access requests being made by MAT 242 to MAT 28. The snapshot may have been triggered by a tracker read/drain request from any core in the computer system.

As indicated by block 606, MAT 242 receives a request to invalidate a particular mapping entry from the Core containing a mapping entry invalidator.

As indicated by block 608, the mapping entry invalidator of the Core issues a first tracking read for the counter to the MAT 242 which returns a value X to the mapping entry invalidator of the Core. Block 608 is ordered with respect to block 606 per PCIe rules in that the invalidation request is a posted right while the first tracker read is a non-posted read.

As indicated by block 610, snapshot 1 has been completed. In the example, some of the memory access requests that were outstanding at the time of snapshot 1 being started (block 604) have been completed which results in the counter value changing to X'. The changing in value of the counter may be multiple units of implementation, a single or multiple units of decrementation or other changes so long as such changes are in a single direction or do not result in a same previous value for the counter since the first snapshot reoccurring. In the example illustrated, block 610 is ordered with respect to block 608 since block 608 returned the same value as that of the counter in block 604, indicating that the snapshot 1 had not yet been completed in block 608.

As indicated by block 612, a snapshot 2 is started. This snapshot may be started from any core. Block 612 is ordered with respect to block 610 in that a snapshot is not to be started while another snampshot is still in progress.

As indicated by block 614, a second read of the counter from Core is sent and returns a value of X'. At such time, the mapping entry invalidator of the Core may record the returned counter value and compare the return counter value to the counter value received in block 608. In the flow illustrated, such a comparison would indicate a single change in the counter having taken place.

As indicated by block 616, the snapshot initiated in block 612 has completed. During such time, additional memory access requests that were previously outstanding have been completed, resulting in the value of the counter changing to X". It should be noted that block 616 is ordered to block 612 as snapshot completions follow snapshot starts.

As indicated by block 618, a third tracker read is issued by the memory entry invalidator of the Core to the MAT 242. It should be noted that block 618 is ordered to block 616 in that an increment can be returned until this snapshot finishes.

As indicated by block 620, the memory entry invalidator of the Core compares the third read return value X" to those previously read values of the counter, indicating that the counter has changed at least twice from the initial value X. As a result, the memory entry invalidator of the Core issues a memory entry invalidation request to the MAT 28, requesting invalidation of the virtual address stored at MAT28 that was previously invalidated in block 606. As shown above, block 618 is ordered with respect to block 612 which is ordered with respect to block 606. As a result, the memory entry invalidator of the Core that issued the invalidation request in block 606 may reliably conclude or determine from the multiple changes in the value counter that the read response received in block 618 was for a snapshot that was taken after the invalidation request by the Core in block 606. The memory entry invalidator of the Core that issued the invalidation request in block 606 may reliably conclude or determine from the multiple changes in the value counter that the last counter value change received in block 618 truly indicates that the outstanding memory access requests for the particular virtual address of MAT 28 corresponding to the virtual address that was invalidated in block 606 by the Core have been completed.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A memory access system comprising:
   a first memory address translator to translate a first virtual address in a first protocol of a memory access request to a second virtual address in a second protocol, the first memory address translator to track memory access request completions;
   a second memory address translator to translate the second virtual address to a physical address of a memory;
   a mapping entry invalidator to request invalidation of a first mapping entry of the first mapping address translator and to request invalidation of a second mapping entry of the second memory address translator corresponding to the first mapping entry following invalidation of the first mapping entry and based upon the tracked memory access request completions.

2. The memory access system of claim 1, wherein the first memory address translator stores a first value for a counter based upon a snapshot of outstanding uncompleted memory access requests transmitted to the second memory access translator upon invalidation of the first mapping entry, wherein the first memory address translator stores a second value, different than the first value, for the counter in response to completion of all previously outstanding uncompleted memory access requests and wherein the mapping entry invalidator is to transmit at least two counter read requests to the first memory address translator following invalidation of the first mapping entry, and wherein the mapping entry invalidator is to request invalidation of the second mapping entry of the second memory address translator based upon a comparison values for the counter received in response to the at least two counter read requests.

3. The memory access system of claim 2 further comprising a second mapping entry invalidator, wherein the second mapping entry invalidator is to transmit at least two counter read requests to the first memory address translator following invalidation of the first mapping entry, wherein the mapping entry invalidator is to request invalidation of the second mapping entry of the second memory address translator based upon a comparison values for the counter received in response to the at least two counter read requests.

4. The memory access system of claim 3, wherein the first mapping entry invalidator is to request invalidation of the second mapping entry of the second memory address translator in response to multiple changes in values for the counter, wherein the second mapping entry invalidator is to request invalidation of the second mapping entry of the second memory address translator in response to multiple changes in values for the counter.

5. The memory access system of claim 1, wherein the second protocol is a Peripheral Component Interconnect Express (PCIe) protocol.

6. The memory access system of claim 1, wherein the second memory address translator is an input output memory management unit (IOMMU).

7. The memory access system of claim 1, wherein the mapping entry invalidator is part of a central processing unit core of a computing system.

8. A memory address translator comprising:
   a mapping table having entries linking a first virtual address in a first protocol to a second address;
   a tracker to track outstanding uncompleted memory access requests output by the memory address translator;

a snapshot module to capture a snapshot of outstanding uncompleted memory access requests corresponding to a mapping entry of the mapping table in response to invalidation of the mapping entry in the mapping table.

9. The memory address translator of claim 8 further comprising a counter, wherein the counter stores a value that changes in response to completion of the outstanding uncompleted memory access requests.

10. The memory address translator of claim 9, wherein the memory address translator is to output the value of the counter in response to receiving a read request from a mapping entry invalidator.

11. A memory entry invalidator comprising a non-transitory computer-readable medium having instructions to direct a processor to:
   output a first entry invalidation request to a first memory address translator, the first entry invalidation request requesting invalidation of a mapping entry of a mapping table;
   receive an indication from the first memory address translator that all outstanding uncompleted memory access requests, corresponding to the mapping entry of the mapping table and output by the first memory address translator to a second memory address translator prior to invalidation of the mapping entry, have been completed; and
   in response to receiving the indication, output a second entry invalidation request to the second memory address translator, the second entry invalidation request requesting invalidation of a second mapping entry of a second mapping table of the second memory address translator.

12. The mapping entry invalidator of claim 11, wherein the instructions are to direct the processor to:
   output a first read request to the first memory address translator following the output of the first entry invalidation request, the first read request requesting an indication of existence of uncompleted outstanding memory access requests corresponding to the mapping entry of the mapping table of the first memory address translator at the invalidation of the mapping entry of the mapping table;
   output a second read request to the first memory address translator, following the first read request, the second request, the second read request requesting an indication of existence of uncompleted outstanding memory access requests corresponding to the mapping entry of the mapping table of the first memory address translator.

13. The mapping entry invalidator of claim 12 further comprising:
   receiving a counter value for each of the first read request and the second read request, the counter value being based upon the existence of uncompleted outstanding memory access requests corresponding to the mapping entry of the mapping table of the first memory address translator;
   comparing the counter value of the first read request to the counter value of the second read request; and
   outputting the second entry invalidation request to the second memory address translator based upon the comparing.

14. The mapping entry invalidator of claim 11, wherein the mapping entry invalidator is part of a central processing unit core of a computing system.

15. The mapping entry invalidator of claim 11, wherein the first memory address translator operates according to a first protocol and wherein the second memory address translator operates according to a second protocol different than the first protocol.

16. The mapping entry invalidator of claim 15, wherein the second protocol comprises a Peripheral Component Interconnect Express (PCIe) protocol.

17. The mapping entry invalidator of claim 11, wherein the second memory address translator is an input output memory management unit (IOMMU) that translates a virtual address to a physical address.

* * * * *